_US011601593B2_

United States Patent
Buck

(10) Patent No.: US 11,601,593 B2
(45) Date of Patent: Mar. 7, 2023

(54) DEVICES AND METHODS FOR LEVELING AND ORIENTING TRAIL CAMERAS

(71) Applicant: John T. Buck, Elmont, NY (US)

(72) Inventor: John T. Buck, Elmont, NY (US)

( * ) Notice: Subject to any disclaimer, the term of this patent is extended or adjusted under 35 U.S.C. 154(b) by 0 days.

(21) Appl. No.: 17/350,482

(22) Filed: Jun. 17, 2021

(65) Prior Publication Data
US 2022/0046173 A1 Feb. 10, 2022

Related U.S. Application Data

(63) Continuation of application No. 16/929,242, filed on Jul. 15, 2020, now abandoned.
(60) Provisional application No. 62/971,931, filed on Feb. 8, 2020.

(51) Int. Cl.
*H04N 5/232* (2006.01)
*H04N 5/225* (2006.01)

(52) U.S. Cl.
CPC ....... *H04N 5/23258* (2013.01); *H04N 5/2252* (2013.01); *H04N 5/23206* (2013.01); *H04N 5/23299* (2018.08)

(58) Field of Classification Search
CPC ............ H04N 5/2252; H04N 5/2256; H04N 5/23206; H04N 5/23258; H04N 5/23299; H04N 7/183
See application file for complete search history.

(56) References Cited

U.S. PATENT DOCUMENTS

| | | | | |
|---|---|---|---|---|
| 8,386,179 | B2* | 2/2013 | MacDonald | G01J 1/0266 73/170.27 |
| 2012/0121125 | A1* | 5/2012 | Dimov | G06V 10/17 348/169 |
| 2015/0276403 | A1* | 10/2015 | Schierbeek | B60R 1/12 33/356 |
| 2016/0366311 | A1* | 12/2016 | Pfiffi | H04N 5/2253 |
| 2019/0075235 | A1* | 3/2019 | Henry | H04B 1/3888 |
| 2019/0335027 | A1* | 10/2019 | Cheng | H04M 1/0264 |
| 2020/0236253 | A1* | 7/2020 | Zou | G03B 17/04 |
| 2021/0014460 | A1* | 1/2021 | D'Acquisto | H04N 5/232945 |
| 2021/0152787 | A1* | 5/2021 | Cuddeback | H04N 5/23241 |
| 2021/0250504 | A1* | 8/2021 | Buck | H04N 5/2256 |

\* cited by examiner

*Primary Examiner* — Amy R Hsu

(57) ABSTRACT

Devices and methods are provided for leveling and orienting a trail camera mounted to a stationary object such as tree. For example, a device for leveling and orienting a trail camera includes a housing element comprising a first cavity and a second cavity formed in an upper surface of the housing element, a compass mounted in the first cavity of the housing element, wherein the compass is configured for use in directionally orienting the trail camera in a target direction, and a bubble level mounted in the second cavity of the housing element. The housing element includes at least one flat surface which is placed against a flat surface of a trail camera housing to determine a level position of the trail camera housing using the bubble level.

20 Claims, 11 Drawing Sheets

200

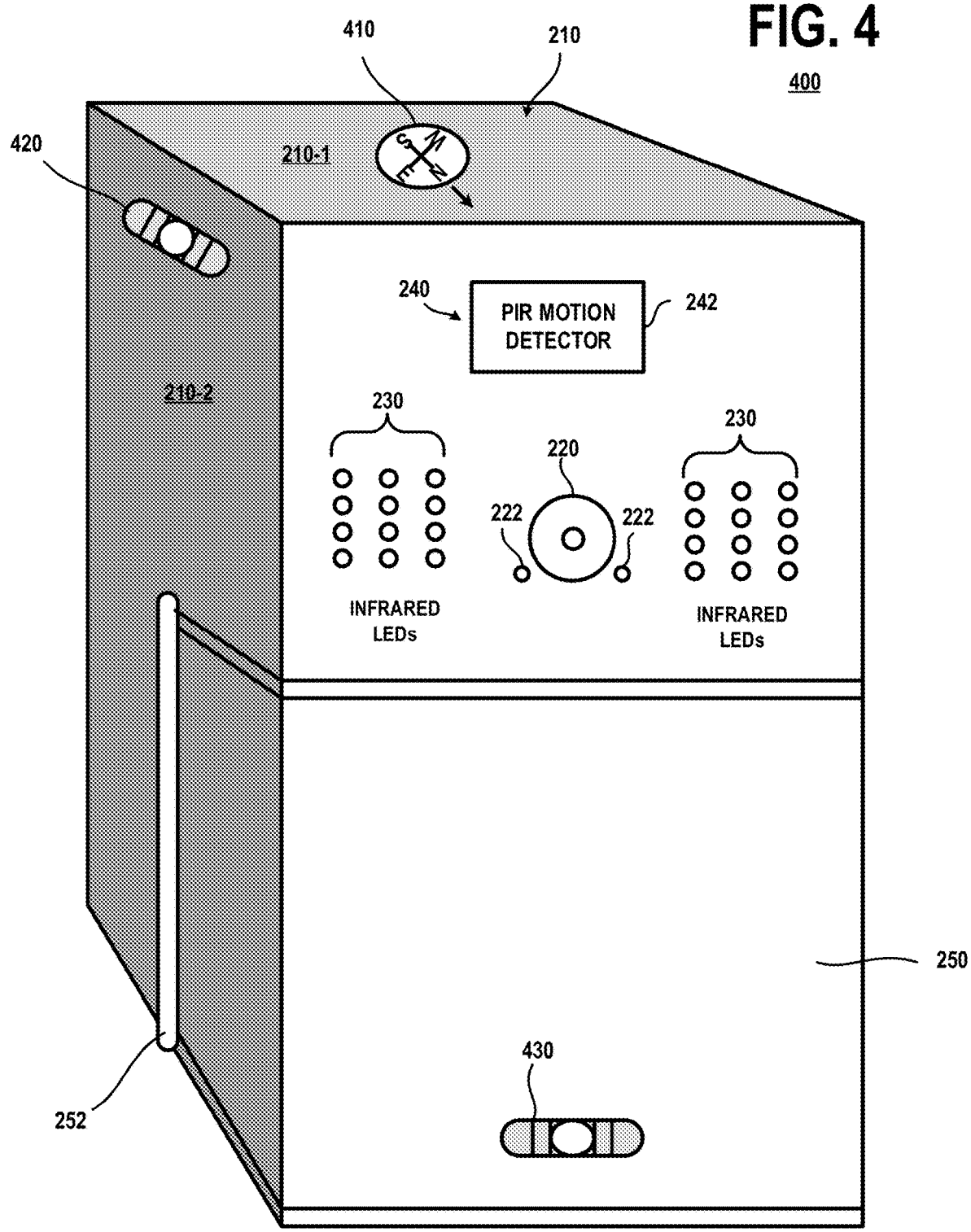

500

600

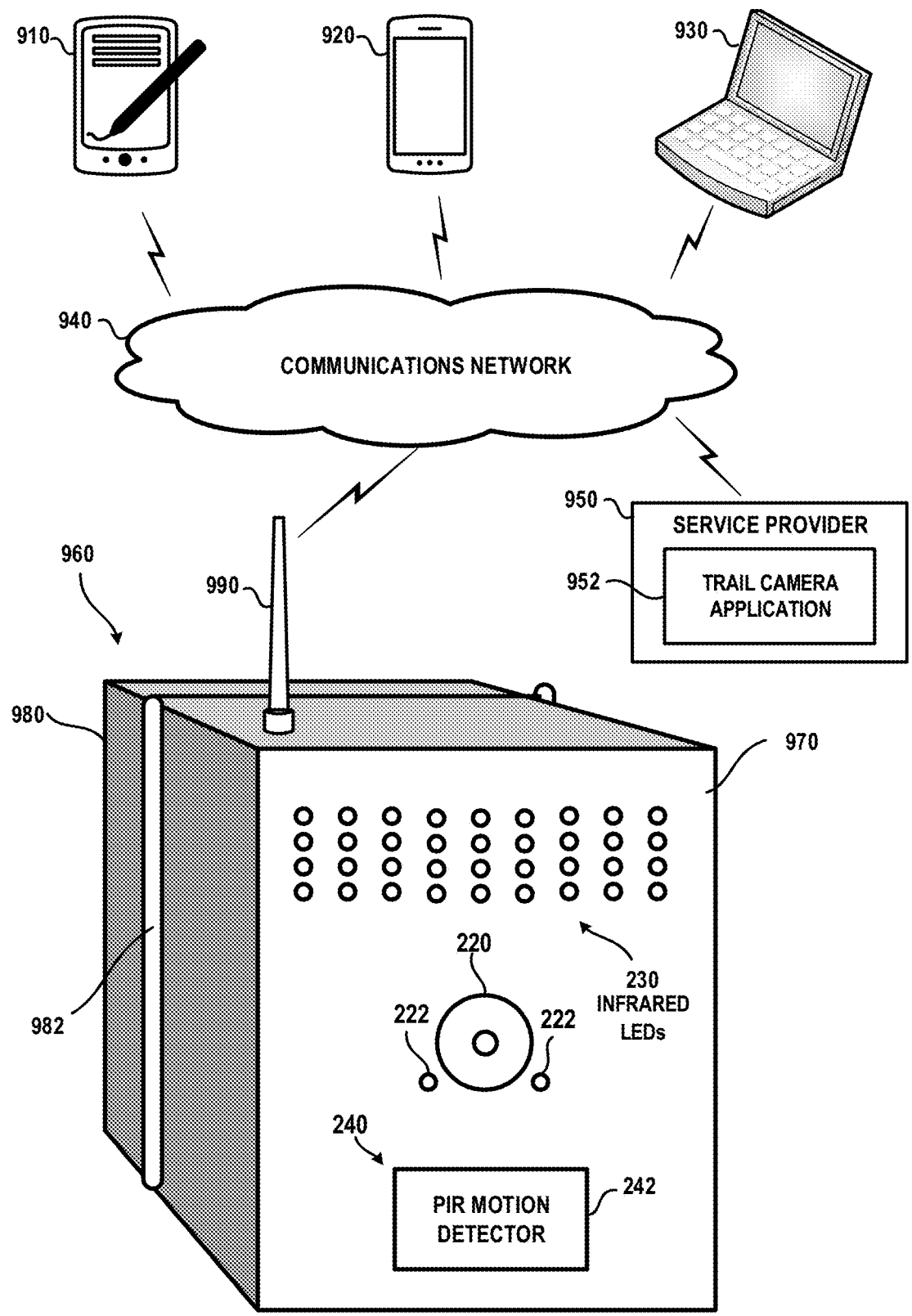

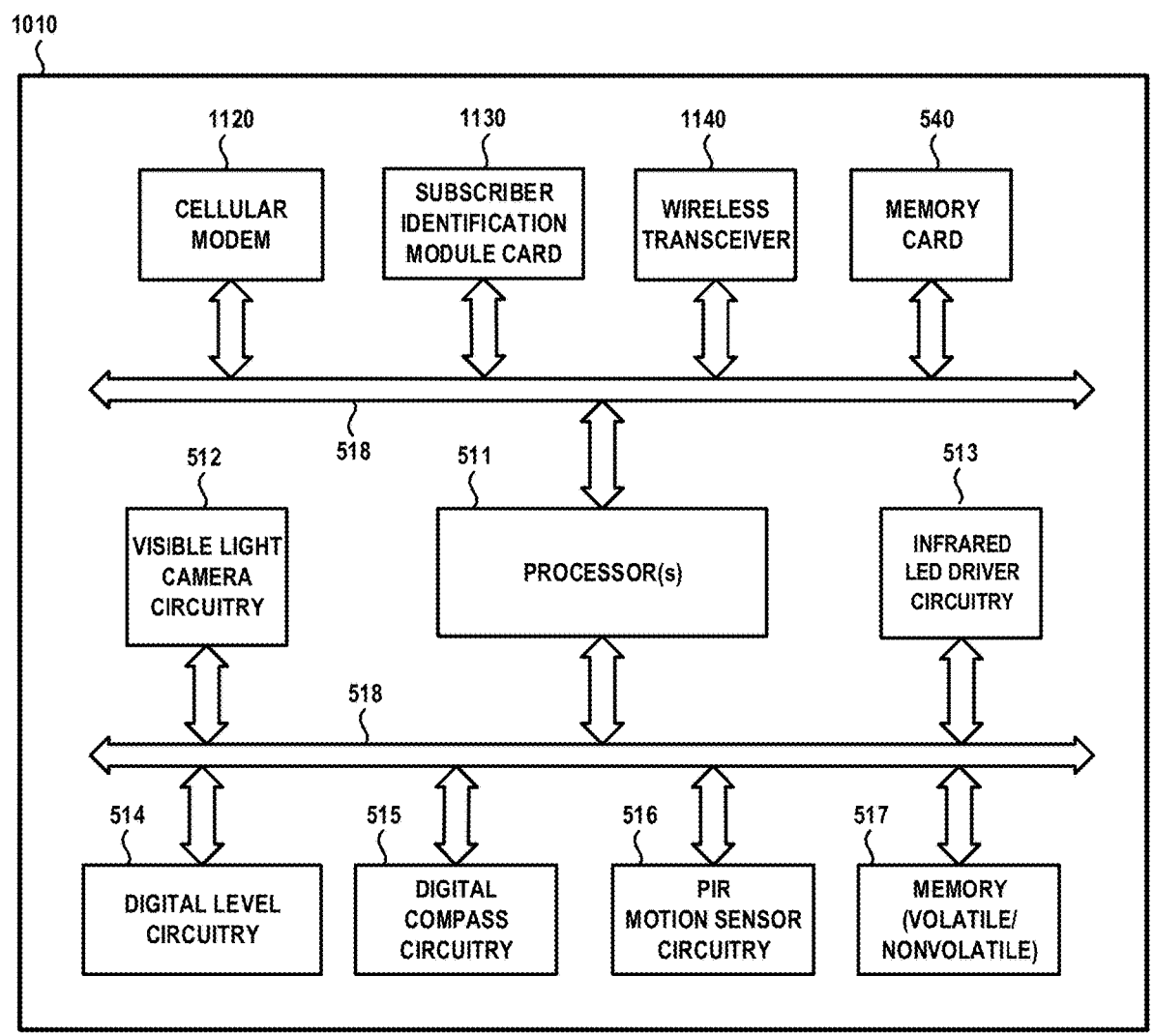

DEVICES AND METHODS FOR LEVELING AND ORIENTING TRAIL CAMERAS

CROSS-REFERENCE TO RELATED APPLICATIONS

This application claims priority to U.S. patent application Ser. No. 16/929,242, filed on Jul. 15, 2020, which claims priority to U.S. Provisional Application Ser. No. 62/971,931, filed on Feb. 8, 2020, the disclosures of which are incorporated herein by reference.

TECHNICAL FIELD

This disclosure relates generally to techniques for leveling and orienting trail cameras.

BACKGROUND

Trail cameras are cameras that are used for various purposes such as hunting or game surveillance. In general, trail cameras have weather-resistant, airtight camera housings, which are designed for extended and unmanned use outdoors to record images (e.g., still photographs or videos) of wildlife and game. While trail cameras can be useful to hunters for various purposes such as pre-season scouting to determine where game is located, capturing frameable images for collection, etc., most users of trail cameras do not know how to properly position a trail camera to capture good images. Indeed, hunters typically do not take into account the negative aspects of improper trail camera orientation and positioning. For example, users of trail cameras neglect to position their trail camera away from sun rays that emanate from eastern, western and southern directions, wherein excessive glare into the camera lens can result in whitewashed or low-grade photo quality. Indeed, when sunlight directly or indirectly strikes the lens of the trail camera, the light is scattered, and sun flare is produced. The sun flare manifests itself in the captured images as sunbursts, circles and/or as a haze. In addition, excessive sun glare can result in constant tripping of a passive infrared (PIR) motion sensor of the trail camera in the early morning and afternoon hours. In this regard, to avoid the negative effects of sun glare in the trail camera lens, it is desirable to position a trail camera south of the intended target imaging area and facing in a northerly direction. Furthermore, the unlevel positioning of a trail camera result in the generation of photographs with a tilted horizon, which can be displeasing to view and result in a non-picturesque image.

SUMMARY

Exemplary embodiments of the disclosure generally include devices and methods for leveling and orienting trail cameras that can be mounted to stationary objects such as trees.

For example, in one exemplary embodiment of the disclosure, a device for leveling and orienting a trail camera comprises: a housing element comprising a first cavity and a second cavity formed in an upper surface of the housing element; a compass mounted in the first cavity of the housing element, wherein the compass is configured for use in directionally orienting the trail camera in a target direction; and a bubble level mounted in the second cavity of the housing element; wherein the housing element comprises at least one flat surface which is placed against a flat surface of a trail camera housing to determine a level position of the trail camera housing using the bubble level.

In another embodiment, a method is provided for mounting a trail camera to a fixed object. The method comprises utilizing a device to level and orient the trail camera, wherein the device comprises: a housing element comprising a first cavity and a second cavity formed in an upper surface of the housing element; a magnetic compass mounted in the first cavity of the housing element, wherein the compass is configured for use in directionally orienting the trail camera in a target direction; and a bubble level mounted in the second cavity of the housing element. The device is utilized to level and orient the trail camera by a process which comprises: utilizing the compass of the device to position the trail camera to face toward a target direction; placing the device against a flat surface of a housing of the trail camera; and maneuvering the trail camera into a level position as indicated by the bubble level, while the device is placed against the flat surface of the housing of the trail camera.

In another embodiment, a trail camera comprises a protective housing, at least one bubble level integrally disposed on or within a surface of the protective housing, and a magnetic compass integrally disposed on or within a surface of the protective housing.

These and other exemplary embodiments of the present disclosure will become apparent from the following detailed description of exemplary embodiments, which is to be read in conjunction with the accompanying figures.

BRIEF DESCRIPTION OF THE DRAWINGS

FIGS. 1A and 1B are perspective views of a device for leveling and orienting a trail camera, according to an embodiment of the disclosure, wherein FIG. 1A is a top view of the device and FIG. 1B is a perspective side view of the device.

FIG. 4 schematically illustrates a trail camera having a compass element and bubble level elements which are integrally formed, or otherwise mounted to, a protective case of the trail camera, according to an embodiment of the disclosure.

FIG. 9 schematically illustrates a system that is configured to enable wireless access to directional orientation and level position information of a trail camera, according to an embodiment of the disclosure.

FIG. 10 schematically illustrates an electronic system of a wireless trail camera which implements circuitry that is configured to sense and display directional orientation and level position information for the wireless trail camera and to wirelessly transmit such information to a computing device of a user, according to an embodiment of the disclosure.

DETAILED DESCRIPTION OF EXEMPLARY EMBODIMENTS

Exemplary embodiments of the disclosure will now be described in further detail with regard to devices, systems, and methods for leveling and orienting trail cameras when mounting trail cameras to stationary objects such as trees.

Figure 1A:
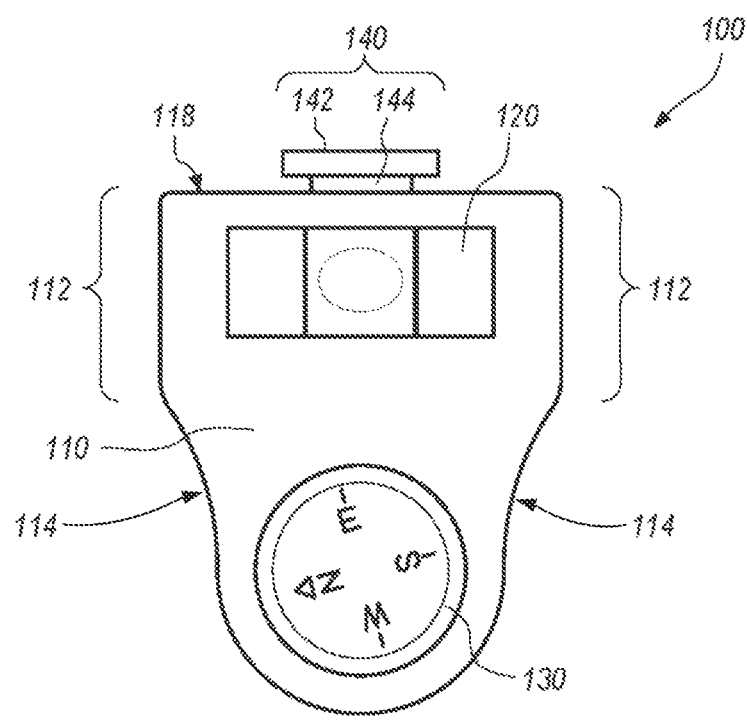
Figure 1B:
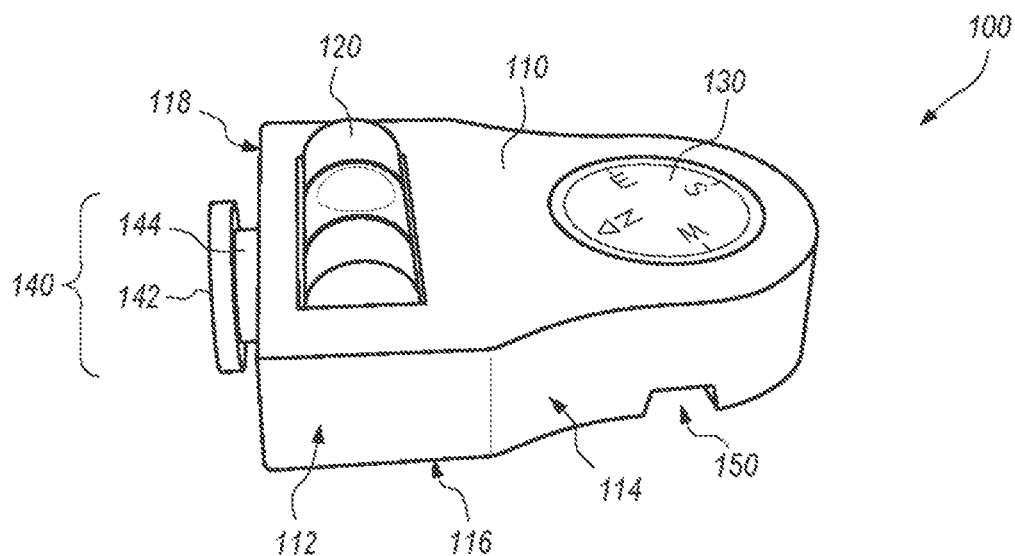

FIGS. 1A and 1B are perspective views of a device 100 for leveling and orienting a trail camera, according to an embodiment of the disclosure. FIG. 1A is a top view of the device 100 and FIG. 1B is a perspective side view of the device 100. The device 100 comprises a housing element 110 which is structurally and dimensionally configured with cavities in which a bubble level 120 and a compass 130 can be fixedly inserted to hold the bubble level 120 and compass 130. The device 100 further comprises an optional adapter element 140 which comprises a flange element 142 and a stub element 144, which are disposed on the backside surface 118 of the housing 110. As explained in further detail below, the adapter element 140 is configured for use with bracket-type trail cameras in which a bracket element is first mounted to a fixed object (e.g., a tree) and the trail camera is mounted to the bracket. The adapter element 140 allows an individual to level and orientate a trail camera bracket prior to installing the trail camera to the bracket. In some embodiments, the housing element 110 comprises single integrated element that may be made of any suitable materials such as plastics or composite materials that are weather resistant, and manufactured using suitable techniques such as injection molding, for example, or by CNC machining techniques.

The housing element 110 comprises sidewalls having flat portions 112 (or planar sidewall portions) and contoured portions 114, a flat bottom portion 116 (planar bottom portion), and a flat backside surface 118. The contoured portions 114 provide an ergonomic configuration that allows a user to readily hold the device 100 using a thumb and pointer finger. The bottom portion 116 further comprises an optional cut-out groove 150 which extends from one side to an opposing side of the housing element 110. In accordance with embodiments of the disclosure, the planar sidewall portions 112 and flat bottom portion 116 provide surfaces which can be placed against flat surfaces of a trail camera housing for purposes of leveling the trail camera by viewing the bubble level 120 while maneuvering the trail camera into a level position. In addition, the compass 130 is utilized to ensure that the trail camera is facing in a target direction (e.g., northward direction).

Figure 2:
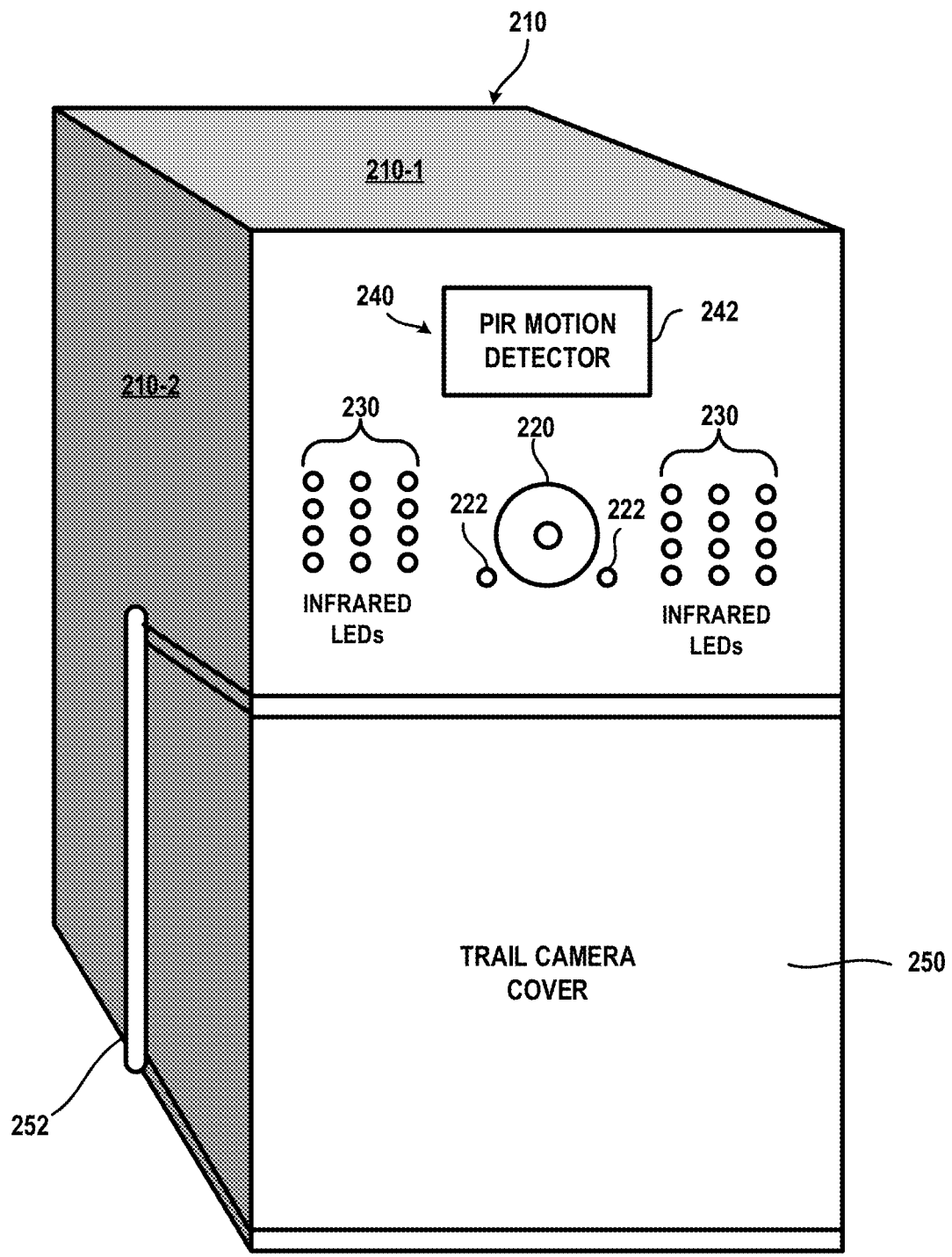
FIG. 2 schematically illustrates a trail camera which can be leveled and directionally orientated using the device of FIGS. 1A and 1B.

FIG. 2 schematically illustrates a trail camera 200 which can be leveled and directionally orientated using the device 100 of FIGS. 1A and 1B. The trail camera 200 comprises a housing 210 (e.g., protective case) comprising an upper surface 210-1 and side surfaces 210-2. The trail camera 200 further comprises a camera lens 220 for a visible light camera, one or more light sensors 222, a plurality of infrared (IR) light emitting diodes (LEDs) 230, and a passive infrared (PIR) motion detector 240 comprising a lens element 242, e.g., a Fresnel lens element. The housing 210 is essentially a protective case which provides an inner compartment to house the trail camera elements including, for example, a visible light camera, PIR motion detector circuitry, LED driver circuitry, a display screen, control buttons, and other components that are commonly included with trail cameras. The trail camera 200 comprises a cover element 250 which is hingedly connected to the housing 210 by a hinge element 252. The cover element 250 can be opened to access the control buttons and the display screen, which collectively provide user interfaces to control settings and functions of the trail camera, view captured images on the display screen, and perform other standard functions of trail cameras.

For illustrative purposes, a brief description will now be provided of various features and functionalities that can be implemented by the trail camera 200. As is known in the art, the PIR motion detector 240 comprises an infrared radiation sensor element and associated detection circuitry, which is mounted to a printed circuit board within the trail camera 200. The PIR motion sensor 240 is configured to detect thermal signatures of objects in a detection area in front of the trail camera 200 (by sensing the thermal infrared radiation emitted from such objects), and detecting motion of objects in the detection area in response to detecting relative changes in the thermal infrared radiation over the detection area. The lens element 242 of the PIR motion detector 240 is typically implemented as a Fresnel lens element. In this instance, the lens element 242 comprises a curved plastic element which comprises an array of Fresnel lenses, where each lens is configured to focus thermal infrared radiation which is captured in different detection zones within the detection area. The detection angle of the PIR motion detector 240 is primarily determined by the design of the Fresnel lens cover 242.

The trail camera 200 comprises a digital camera which is configured to capture digital images and digital video. The digital camera comprises a visible light imager and associated image processing circuitry that is mounted to the printed circuit board of the trail camera 200. The digital camera can be configured to capture single still digital images, bursts of still digital images, and/or video. The camera lens 220 is configured to focus light to the visible light imager within the housing 210. The camera lens 220 can be a fixed focal-length lens that provides a specific field of view, or the camera lens 220 can be a user-changeable lens that allows a user to change the lens to provide wide angle or narrow angle viewing, as desired.

The infrared LEDs 230 are configured to emit infrared light to provide light (e.g., flash illumination) for capturing digital images and/or digital video in low light or dark conditions (e.g., at night). When a digital image is captured or when a video is taken at night (or in low light conditions), the infrared LEDs 230 are activated to provide light for the exposure. The light sensors 222 (e.g., photodetectors) and associated light detection circuitry are configured to detect a level of ambient light in the environment and generate a control signal to cause the infrared LEDs 230 to be activated when the level of ambient light is below a given threshold level at a time when a digital image or video is being taken.

In some trail cameras, the infrared LEDs 230 are configured to emit a given wavelength of infrared light, which results in black and white images, or slightly tinted shades of green or red. For example, the infrared LEDs 230 can may be low-glow infrared LEDs or no-glow infrared LEDs, which emit infrared light at wavelengths that are above the visible light spectrum and cannot be readily seen by animals and thus, will not startle animals being photographed. Low-glow infrared flashes operate slightly above the visible light spectrum and emit infrared light at wavelengths in the range of about 732 nm to 850 nm, which can be seen by humans and animals as a faint red glow light. On the other hand, no-glow infrared flashes operate above the visible light spectrum and emit infrared light at wavelengths in the range of about 864 nm to 940 nm, which cannot be seen by humans and animals (e.g., providing a stealth flash). Some trail cameras utilize white-light LEDs which are configured to emit white light flash illumination for capturing color images and videos at night, but white flash illumination is not typically used as the white light can scare an animal and cause it to flee. The visible light imager that is used for the digital camera is configured to detect and capture infrared light at the wavelengths emitted by the low-glow or no-glow infrared LEDs 230 so that good quality images and videos can be captured at night under the flash illumination emitted from the infrared LEDs 230.

In general, the trail camera 200 is configured to operate in a "sleep state" or "stand-by mode" during times when no digital images or videos are being taken. When the PIR motion detector 240 detects motion, the trail camera "wakes up" and various functions are triggered. Such functions include, but are not limited to, detecting ambient light levels, activating the infrared LEDs 230 for flash illumination (if ambient light levels are low), activating the camera shutter, capturing one or more digital images or video under control of the camera electronics, storing the captured digital images or video on a SD (secure digital) card, etc. The trail camera then returns to stand-by mode until a next trigger event of the PIR motion detector 240.

The manufacturers of trail cameras provide protective cases with various types of mounting mechanisms, depending on the given design. For example, in some designs, a trail camera can be mounted to an object by bolting or screwing the protective case to the object (e.g., a tree or post). In other designs, a trail camera can be mounted to an object using a strap or chain, etc. wherein the trail camera is essentially strapped or chained to tree or post. With these mounting mechanisms, the protective cases are generally square or rectangular in shape and have flat sides. In this regard, the device 100 of FIGS. 1A and 1B can be utilized for leveling and directionally orienting the trail camera 200 when screwing or strapping the protective case 210 of the trail camera 200 to a stationary object such as a tree or post.

For example, as noted above, the compass 130 is utilized to determine which side of the object (e.g., tree or post) is facing the desired direction (e.g., northward direction) so that when the trail camera 200 is mounted to the object, the lens 220 of the camera is facing in the desired direction (e.g., northward direction). Next, when mounting the protective case 210 to the object, the bubble level 120 of the device 100 can be used to ensure that the protective case is placed in a level position before screwing, bolting, strapping, or otherwise securing the protective case 210 of the trail camera 200 to the object.

In one embodiment, leveling can be performed by placing one of the planar sidewall portions 112 of the device 100 against one of the flat sidewall surfaces 210-2 of the protective case 210 of the trail camera 200, and viewing the bubble level 120 while maneuvering the protective case 210 of the trail camera 200 into a vertically level position (i.e., vertically level with respect to the sides of the protective case 210). Similarly, if desired, leveling can be performed by placing one of the planar sidewall portions 112 of the device 100 against a flat portion of the front side surface of the protective case 210 of the trail camera 200, and viewing the bubble level 120 while maneuvering the protective case 210 of the trail camera 200 into a vertical level position (i.e., vertically level with respect to the front and back sides of the protective case 210).

It is to be noted, however, that in some instances, an individual may mount the trail camera 200 to an object at an elevated position, and then have the front-side of the trail camera 200 pointing in a downwardly direction such that the front-side of the trail camera 200 is not vertically level. In this instance, the bubble level 120 can also be utilized to estimate or otherwise determine through delineated markings on the bubble level 120, the degree to which the front-side of the trail camera is non-level and the angle of downward direction to which the trail camera is directionally orientated. In any event, when the trail camera 200 is placed in a high position on or tree or post, and is facing downward, the front-to-back (vertical) level position is not as important as the side-to-side (horizontal) level position, as pointing the camera down at an angle diminishes the detection range, causing the intended target to be closer to the trail camera, which may bring unwanted attention to the flash illumination emitted from the infrared LEDs 230. It is preferable to place the trail camera 200 at a height of about 3 feet to about 4 feet from the ground, with both horizontal and vertical leveling.

In another embodiment, leveling can be performed by placing the flat bottom side 116 of the device 100 against the upper surface 210-1 of the protective case 210 of the trail camera 200 with the ends of the bubble level 120 facing the opposing sidewalls 210-2 of the protective case 210, and viewing the bubble level 120 while maneuvering the protective case 210 of the trail camera 200 into a vertically level position (i.e., vertically level with respect to the sides 210-2 of the protective case 210). In this instance, when the protective case 210 comprises a rib element or flange element on the upper surface 210-1 of the protective case 210, the flat bottom side 116 of the device 100 can be placed on the upper surface 210-1 of the protective case 210 with the cut-out groove 150 disposed over the rib or flange element so that the device 100 lays flat on the upper surface 210-1 of the protective case 210.

In other embodiments, as noted above, the adapter element 140 of the device 100 is configured for use with bracket-type trail cameras in which a bracket element is first mounted to a fixed object (e.g., a tree) and the trail camera is mounted to the bracket. The adapter element 140 allows an individual to directionally orientate and level a trail camera bracket prior to installing the trail camera to the bracket. Various types of camera mounts exist which include gimbal, ball bearings to provide additional angles on a longitude and latitude plane from a fixed position. Such mounts support trail cameras with threaded inserts allows the trail cameras to be rotate 360 degrees and be tilted up and down about 120 degrees, with simple designs of screwing the camera mounts directly into trees.

Figure 3A:
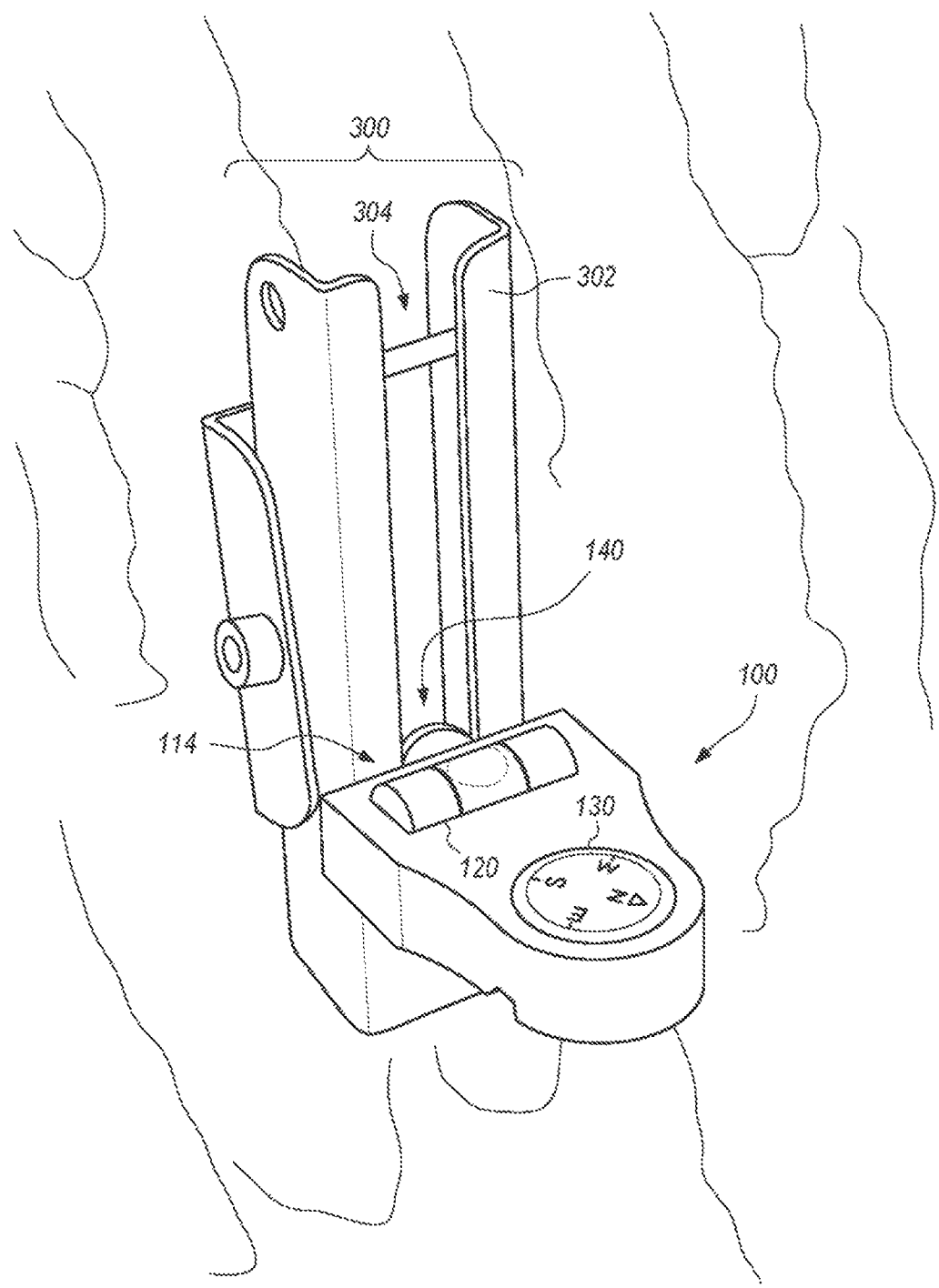
FIGS. 3A, 3B and 3C schematically illustrate a method of using the device of FIGS. 1A and 1B for leveling and directionally orienting a trail camera mount, according to an embodiment of the disclosure.
Figure 3B:
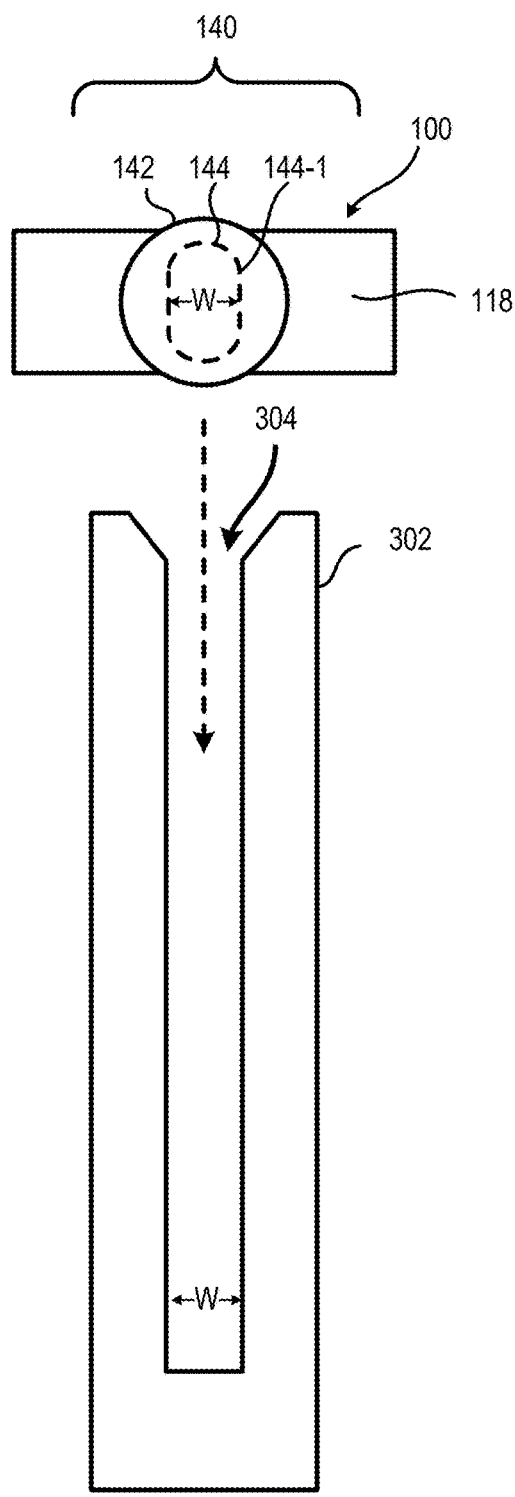

FIGS. 3A, 3B and 3B schematically illustrate a method of using the device 100 for leveling and directionally orienting a camera mount, according to an embodiment of the disclosure. FIG. 3A is a perspective view which shows a trail camera mounting bracket 300 connected to a tree, wherein the mounting bracket 300 comprises a slotted bracket member 302 which comprises an elongated slot 304. The elongated slot 304 is configured to engage a mounting stub that is disposed on the backside of a trail camera protective case to connect the trail camera to the mounting bracket 300. In this embodiment, the device 100 is utilized to directionally orientate and level the mounting bracket 300 before screwing the mounting bracket to the tree, as shown in FIG. 3A.

Figure 3C:
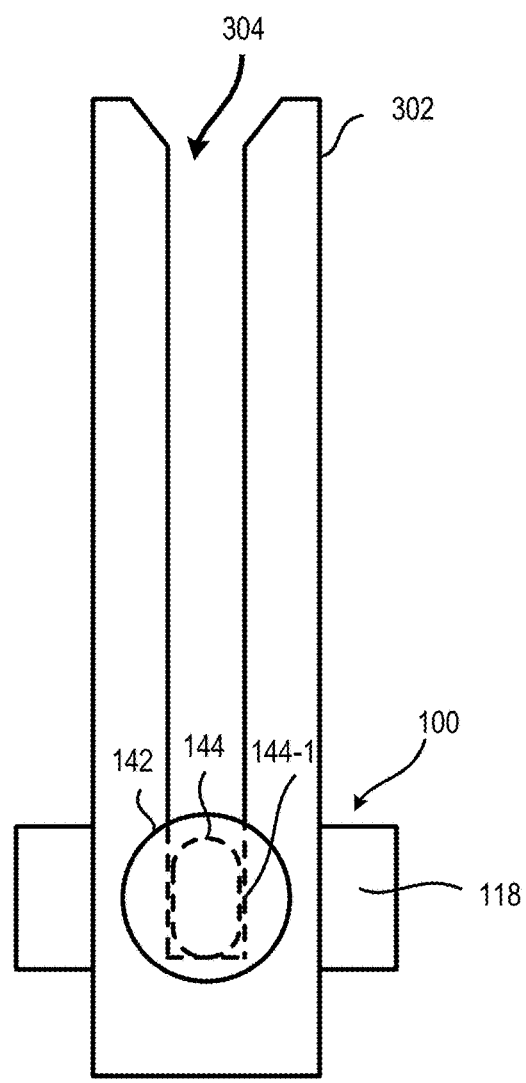

In particular, FIGS. 3B and 3C schematically illustrate a method for slideably mounting the adapter element 140 of the device 100 to the slotted bracket member 302. FIG. 3B shows illustrates an initial position of the device 100 where the adapter element 140 is positioned at an open end of the elongated slot 304. As shown in FIG. 3B, the stub element 144 of the adapter 140 comprises opposing flat sidewalls 144-1 which define a width W that is substantially the same as the width W of the elongated slot 304 at a closed end of the elongated slot 304. FIG. 3C illustrates a final position of the device 100 where the adapter element 140 is positioned at the closed end (bottom end) of the elongated slot 304. This is achieved by inserting the stub element 144 of the adapter 140 into the open end of the elongated slot 304 with the slotted bracket member 302 disposed between the flat backside 118 of the device 100 and the wide flange element 142 of the adaptor 140, and then sliding the device 100 down to the bottom end of the elongated slot 304.

In this configuration as shown in FIG. 3C, the wide flange element (which is wider than the width W of the slot 304, holds the flat backside 118 of the device 100 against the front face of the slotted bracket member 302, while the opposing flat sidewalls 144-1 of the stub element 144 keep the device 100 in a fixed position/orientation by preventing the device 100 from rotating with the adaptor element 140 engaged with slotted bracket member 302. Furthermore, in the configuration shown in FIG. 3C, the device 100, and thus the bubble level 120, is positioned "square" with a vertical longitudinal axis of the slotted bracket member 302, which allows the slotted bracket member 302 to be vertically leveled using the bubble level 120.

As shown in FIG. 3A, with the device 100 mounted to the slotted bracket member 302 of the mounting bracket 300, the compass 130 of the device 100 is utilized to determine which side of the tree (or other stationary object) is facing a desired direction (e.g., northward direction) so that when the trail camera 200 is mounted to the object, the lens 220 of the visible light camera and the flash illumination IR LEDs 230 are facing in the desired direction (e.g., northward direction). Once the proper location is determined, an individual can place the mounting bracket 300 in a vertical position against the side of the tree and view the bubble level 120 while maneuvering the mounting bracket 300 into a vertical level position.

It is to be understood that the device 100 of FIGS. 1A and 1B can be utilized with other types of mounting brackets. For example, some trail camera mounting brackets provide an elaborate tripod, and pan-tilt mechanism which comprises an element that is the same or similar to the slotted bracket member 302 as shown in FIGS. 3A-3C, wherein the slotted bracket member 302 is coupled to a tripod socket mechanism, wherein the tripod socket mechanism is screwed to, e.g., a tree or post, and wherein the tripod socket mechanism is configured to adjust the slotted bracket member 302 in three dimensions.

In another embodiment, a trail camera can be directionally orientated and leveled using bubble levels and a compass element that are integrated with the protective housing. For example, FIG. 4 schematically illustrates a trail camera 400 having a compass element and bubble level elements which are integrally formed, or otherwise mounted to, a protective case 210 of the trail camera 400. In particular, the trail camera 400 of FIG. 4 is similar to the trail camera 200 of FIG. 2, except that the trail camera 400 comprises a compass element 410 which is integrally formed on or within the upper surface 210-1 of the protective case 210 to allow an individual to directionally orientate the trail camera 400. In addition, the trail camera 400 comprises a first bubble level 420 which is disposed on, or within, the sidewall 210-2 of the protective case 210 to allow an individual to vertically level the front and back sides of the protective case 210. Further, the trail camera 400 comprises a second bubble level 430 which is disposed on, or within, a frontside surface (e.g., hinged cover 250) of the protective case 210 to allow an individual to vertically level the sidewalls 210-2 of the protective case 210. It is to be understood that the positions of the compass element 410 and bubble levels 420 and 430 as shown in FIG. 4 are merely an illustrative example for positioning such elements, and that such elements can be disposed in other areas of the protective case 210. For example, in some embodiments, the protective case 210 can have a circular bubble level disposed on, or within, the upper surface 210-1 which allows the trail camera 400 to be leveled side-to-side and front-to-back using the single circular bubble level.

Figure 5:
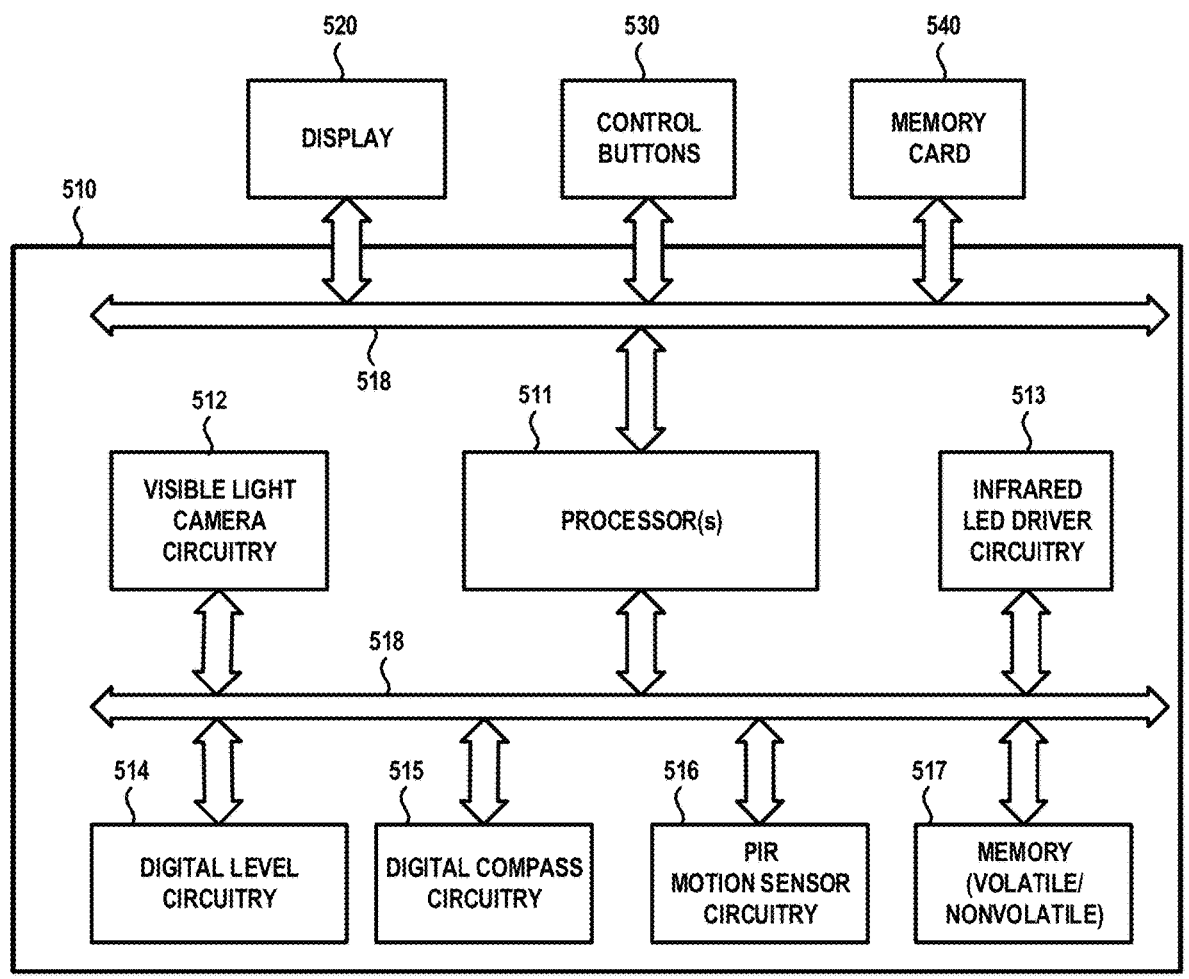
FIG. 5 schematically illustrates an electronic system of a trail camera which implements digital circuitry that is configured to sense and display directional orientation and level position information for the trail camera, according to an embodiment of the disclosure.

In other embodiments of the disclosure, a trail camera can be designed with digital level and compass circuitry with proper user interfaces to allow users to directionally orientate and level the trail camera using digitally displayed level and directional orientation information. For example, FIG. 5 schematically illustrates an electronic system of a trail camera which implements digital circuitry that is configured to sense and display directional orientation and level position information for the trail camera, according to an embodiment of the disclosure. Referring to FIG. 5, the electronic system 500 comprises a circuit board 510 which comprises various integrated circuit (IC) chips and electronic components such as one or more processors 511, visible light camera circuitry 512 (e.g., imager and read-out circuitry), infrared LED driver circuitry 513, digital level circuitry 514, digital compass circuitry 515, PIR motion sensor circuitry 516, and memory 517 (volatile and non-volatile memory), which are connected using one or more internal busses 518 (e.g., system bus, frontside bus, expansion bus, and/or others suitable types of hardware busses) and associated bridges. In addition, the electronic system 500 comprises an electronic display 520 (e.g., liquid crystal display (LCD)) to display various types of control information and captured images, etc., control buttons 530 to control functionality and operation of the trail camera, and a removable memory card 540 (e.g., SD card) to provide added storage for captured images and video files.

The processors 511 comprise one or more types of hardware processors that are configured to process program instructions and data to execute a native operating system (OS) and program code that is executed by the processor 511 to implements various functions of a trail camera. The processors 511 may comprise one or more central processing units (CPUs), a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc.

The memory 517 comprises various types of memory such as volatile random-access memory (RAM) (e.g., dynamic RAM), non-volatile random-access memory (NVRAM), or other types of memory, in any combination. The memory 517 comprises "system memory" which comprises volatile and/or non-volatile memory that is used to store application program instructions that are read and processed by the processors 511 to execute the trail camera OS and one or more programs or processes to implement the various functionalities of the trail camera, and to temporarily store data that is utilized and/or generated by the OS and application programs being executed by the processor. In addition, the memory 517 provides persistent memory to persistently store configuration and/or control settings of the trail camera, which are used to control and implement functions of the trail camera which are executed by, or under control of, the processors 511. The memory 517 can be implemented using a flash memory device, an SSD (solid state drive) device, or other types and combinations of non-volatile memory devices, which are suitable for the given application.

The visible light camera circuitry 512, and the PIR motion sensor circuitry 516 are implemented using known imagers and sensors (e.g., visible light imagers, thermal IR sensors, etc.), associated read-out circuitry, and IR sensor processing circuitry commonly implemented in trail cameras. The infrared LED driver circuitry 513 comprises, or is otherwise responsive to control signals generated by, light detection circuitry (e.g., photodetectors and associated control/detection circuitry) that is configured to detect a level of ambient light in the environment that is captured by the light sensors 222, and generate a control signal to cause the infrared LEDs 230 to be activated when the level of ambient light is below a given threshold level at a time when a digital image or video is being taken.

In some embodiments, the digital level circuitry 514 and digital compass circuitry 515 are implemented using commercially available, or proprietary state-of-the-art, digital level and orientation sensing technologies. For example, in some embodiments, the digital compass circuitry 515 is implemented using magnetic sensor technology or magneto-inductive technology which is configured to electronically sense and the earth's magnetic field to determine directional orientation. The digital level circuitry 514 can be implemented using, for example, any suitable electronic inclinometer sensor technology which is configured to electronically sense the inclination, slope or tilt of an object. For example, in some embodiments, an accelerometer sensor can be utilized to implement an electronic level using known techniques. In some embodiments, the digital level circuitry 514 is implemented to enable side-to-side leveling of the trail camera and front-to-back leveling of the trail camera.

Figure 6:
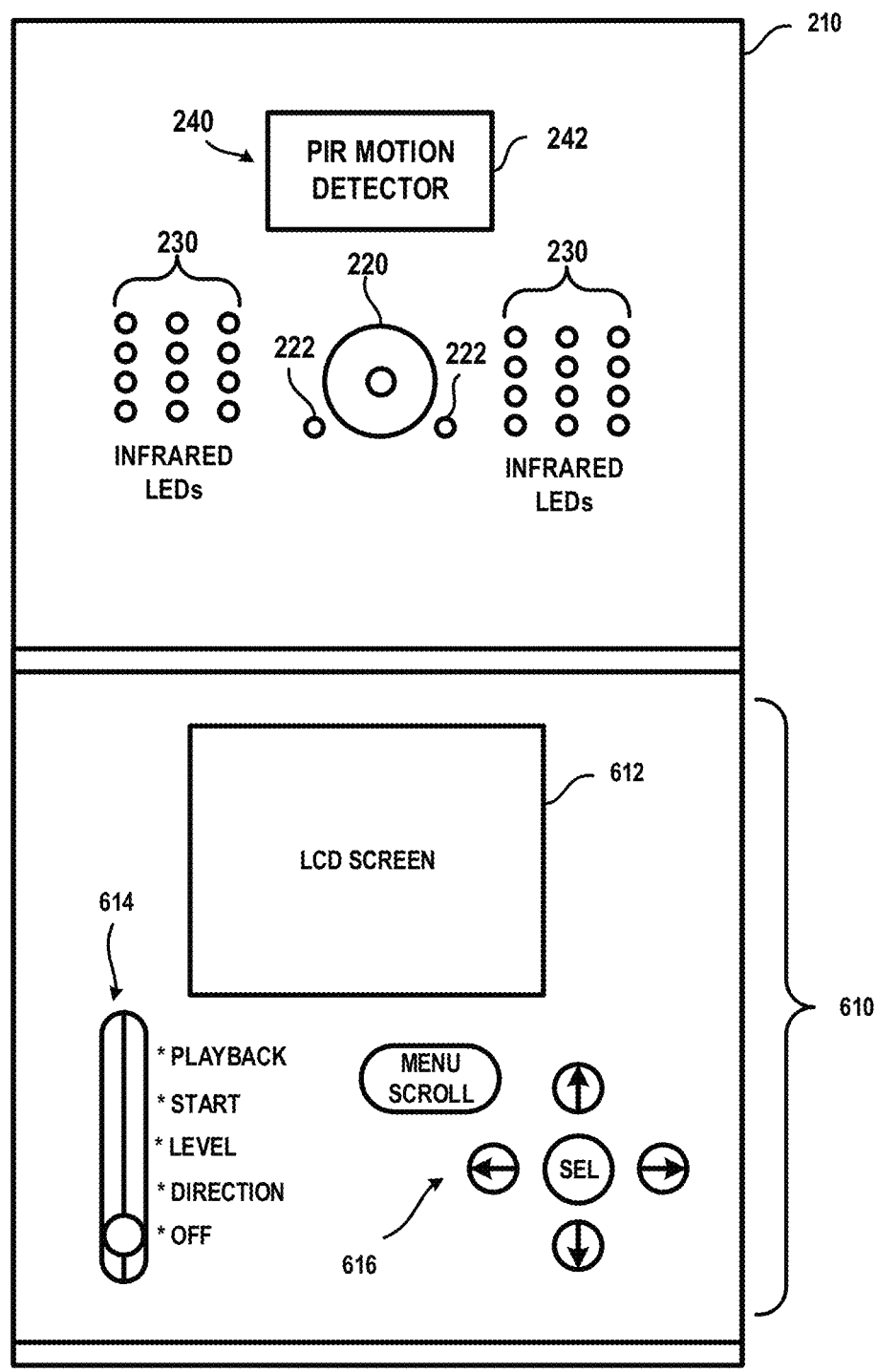
FIG. 6 schematically illustrates a trail camera which comprises an electronic system that is configured to electronically sense and display directional orientation and level position information for the trail camera, according to an embodiment of the disclosure.

FIG. 6 schematically illustrates a trail camera 600 which comprises an electronic system that is configured to electronically sense and display directional orientation and level position information for the trail camera, according to an embodiment of the disclosure. In some embodiments, the trail camera 600 implements the electronic system 500 shown in FIG. 5 to implement various camera functions including digital circuitry for sensing and displaying directional orientation and level position information for the trail camera 600. FIG. 6 illustrates an exemplary embodiment of the trail camera 200 of FIG. 2 with the cover element 250 opened to show a control interface 610 comprising an LCD screen 612, and various control buttons 614 and 616 to control settings and functions of the trail camera. The control button 614 comprises a sliding button that can be slideably moved from an "OFF" position (where the trail camera 600 is turned off) to other positions to perform functions such as, e.g., (i) "Direction" to sense and display a directional orientation of the trail camera 600, (ii) "Level" to sense and display level information of the trail camera 600, (iii) "Start" to start an automatic image capture mode and (iv) "Playback" to playback captured images, etc. In other embodiments, the leveling and direction modes can be selectively activated by utilizing the control buttons 616 to toggle through operational modes of the trail camera which are displayed on the LCD screen 612 and selecting a desired operational mode (e.g., level mode, direction mode, etc.) using a select (SEL) button of the control buttons 616.

Figure 7:
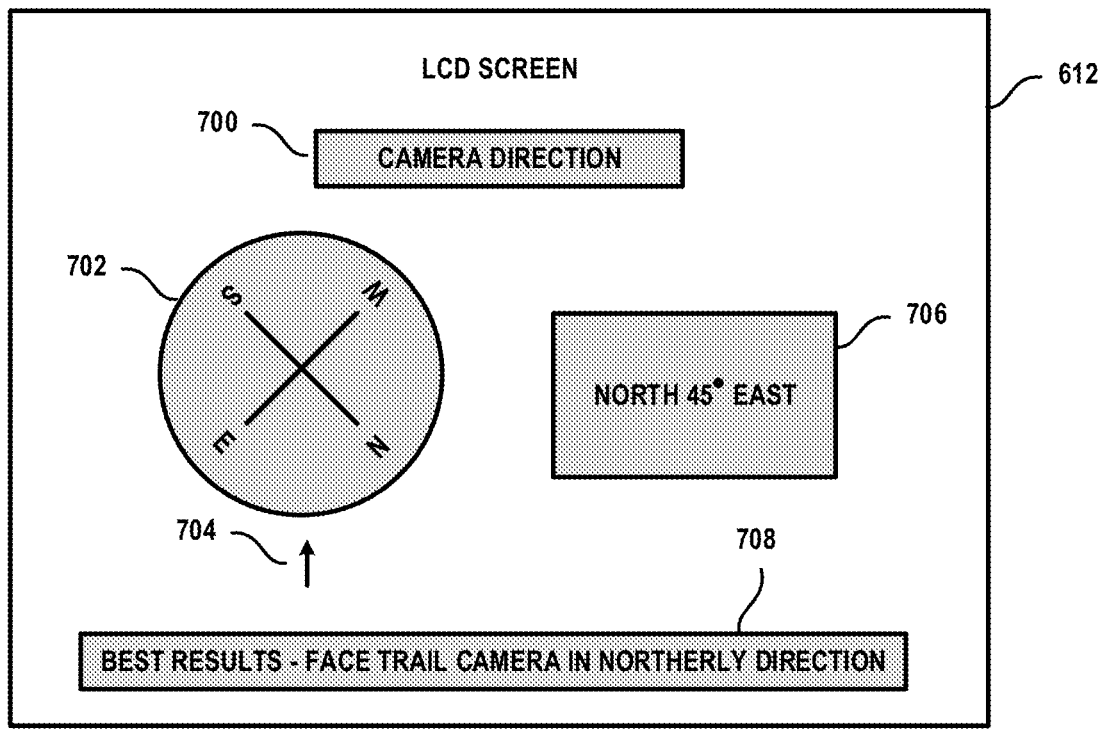
FIG. 7 schematically illustrates a method for displaying directional orientation information of a trail camera, according to an embodiment of the disclosure.

FIG. 7 schematically illustrates a method for displaying directional orientation information of a trail camera, according to an embodiment of the disclosure. In particular, FIG. 7 illustrates an exemplary mode of operation of the trail camera 600 of FIG. 6 in the "Direction" operational mode to sense and display a directional orientation of the trail camera 600. In the "Direction" mode, the LCD screen 612 can display an indicator 700 (e.g., "Camera Direction") to provide an indication to the user that the trail camera 600 is in a "Direction" sensing mode. In the Direction sensing mode, a virtual compass 702 can be displayed to visually illustrate a directional orientation of the trail camera 600 with respect to a displayed pointer 704. In addition to the virtual compass 720 (or alternative to the virtual compass 702), the LCD screen 610 can display textual direction information 706 to illustrate a directional orientation of the trail camera 600. In addition, as an optional feature, a textual suggestion 708 can be displayed to remind the user that that best image capturing results can be obtained by facing the trail camera 600 in a northerly direction. It is to be understood that FIG. 7 illustrates non-limiting exemplary embodiments for displaying camera direction information on the LCD screen 612, and that other techniques can be implemented for rendering and displaying direction information on the LCD screen 612.

Figure 8A:
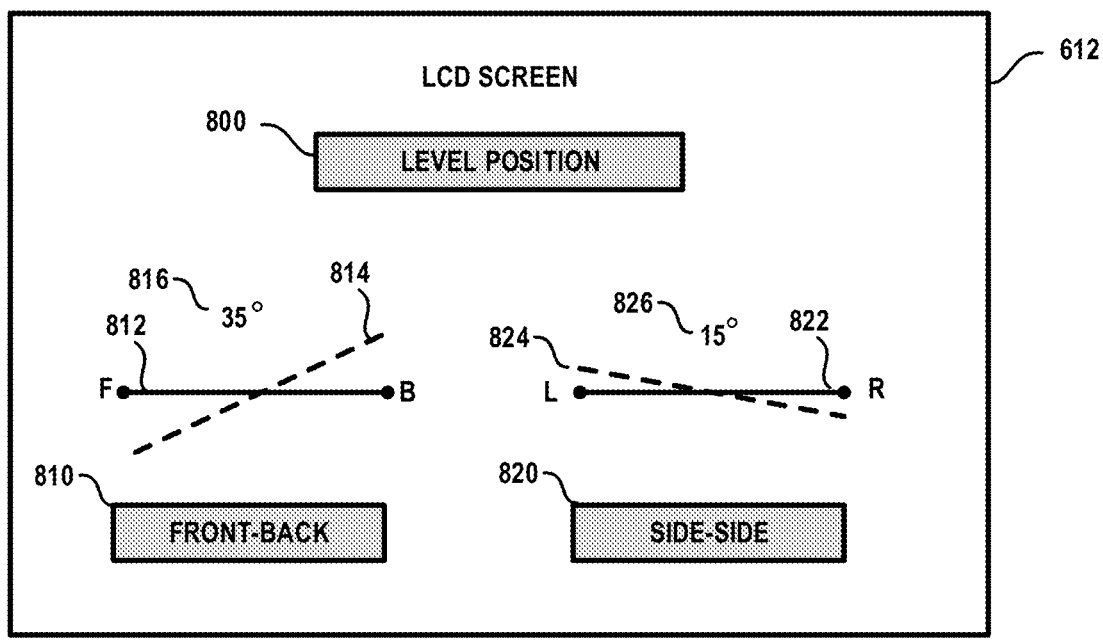
FIGS. 8A and 8B schematically illustrate methods for displaying level position information of a trail camera, according to embodiments of the disclosure.
Figure 8B:
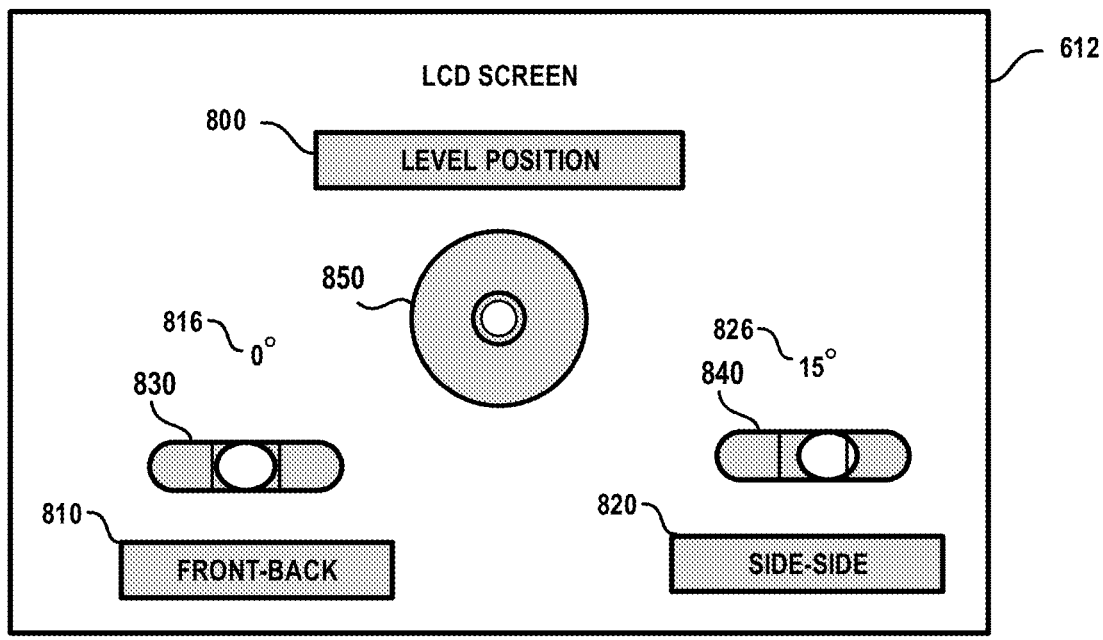

FIGS. 8A and 8B schematically illustrate methods for displaying level position information of a trail camera, according to embodiments of the disclosure. In particular, FIG. 8A illustrates an exemplary mode of operation of the trail camera 600 of FIG. 6 in the "Level" mode to sense and display the levelness of the trail camera 600. In some embodiments, in the "Level" mode, the LCD screen 612 can display an indicator 800 (e.g., "Level Position") to provide an indication to the user that the trail camera 600 is in the "Level" mode. In the "Level" mode, a front-back indicator 810 can be displayed to show the degree of levelness (or non-levelness) of the trail camera 600 relative to the front and back side surfaces of the trail camera 600. In addition, a side-side indicator 820 can be displayed to show the degree of levelness (or non-levelness) of the trail camera 600 relative to the sides of the trail camera 600. In other embodiments, the level position information (side-to-side and/or back-to-front) can be displayed using virtual bubble levels in which virtual bubble levels are displayed in conjunction with numerical values or graphics which indicate pitch and level.

In some embodiments, as shown in FIG. 8A, the level indication can be illustrated by displaying fixed solid lines 812 (F-B) and 822 (L-R) which provide level reference indicators (e.g., azimuth horizon), and movable dashed lines 814 and 824 which indicate the degree of non-levelness of the trail camera 600 with respect to the fixed reference lines 812 and 822. In addition, numerical values 816 and 826 can be displayed to provide an indication of the degree of inclination of the font-back and side-side relative to the fixed level lines 812 and 822. In the exemplary embodiment of FIG. 8A, the front-back level information 810 shows that the front surface (F) of the trail camera is facing downward at an angle of 35 degrees relative to the reference level 812, and that the right side (R) of the trail camera is tilted downward at an angle of 15 degrees relative to the reference level 822. It is to be understood that FIG. 8A illustrates non-limiting exemplary embodiments for displaying camera level information on the LCD screen 612, and that other techniques can be implemented for rendering and displaying level information on the LCD screen 612.

For example, FIG. 8B illustrates an exemplary mode of operation of the trail camera 600 of FIG. 6 in the "Level" mode to sense and display the levelness of the trail camera 600, wherein first and second virtual bubble levels 830 and 840 can be displayed to visually show front-to-back levelness and side-to-side levelness, respectively. In other embodiments, as shown in FIG. 8B, a single virtual bubble level 850 can be displayed which visually illustrates both front-to-back levelness and side-to-side levelness. In particular, the single virtual bubble level 850 comprises a circular bull's eye bubble level which allows for leveling of planes in two dimensions.

It is to be understood that the type of level information and directional information that is displayed on the LCD screen 612 can vary depending on the resolution and/or size of the LCD screen 612. For example, some trail cameras have low grade, low resolution and small size LCD screens which are not designed to display images, and which are configured to display low resolution textual characters. In this regard, the direction information that is display on such LCD screens can be limited to, e.g., the textual direction information 706 of FIG. 7. In addition, level information that is displayed on small, low resolution LCD screens can be limited to, e.g., the numerical values 816 and 826 of FIGS. 8A and 8B which provide an indication of the degree of inclination of the font-back and side-side relative to a fixed reference level (e.g., either horizontal or vertical reference).

In other embodiments of the disclosure, the device 100 of FIGS. 1A and 1B can include an electronic level and an electronic compass instead of the physical bubble levels 120 and physical magnetic compass 130 elements. In this regard, the device 100 could have digital level circuitry and digital compass circuitry, a battery, and a small LCD screen, and a microprocessor to render and display level and orientation information on the small LCD screen, using methods as discussed herein.

In other embodiments of the disclosure, trail cameras are configured to allow users to wirelessly access and control their trail cameras through an application user interface that is rendered on a computing device or system apart from the trail camera. In such embodiments, the application user interface is configured with functionality that allows a user to wirelessly access directional orientation and level position information from the user's trail camera, and display or otherwise render such directional orientation and level position information on the user's computing device. For example, FIG. 9 schematically illustrates a system that is configured to enable wireless access to directional orientation and level position information of a trail camera, according to an embodiment of the disclosure.

More specifically, FIG. 9 illustrates a system 900 which comprises a plurality of user computing devices 910, 920, and 930, a communications network 940, a service provider 950, and a wireless trail camera 960. The computing devices include, for example, an electronic tablet 910, a smart phone 920, and a laptop computer 930. The computing devices 910, 920, and 930 can access and communicate with the service provider 950 and the wireless trail camera 960 over the communications network 940. In some embodiments, the service provider 950 comprises a website that is supported and maintained by a trail camera manufacturer, wherein the service provider 950 provides access to a trail camera application 952 to access and control the wireless trail camera 960. In some embodiments, the user can download the trail camera application 952 to one or more of the user's computing devices 910, 920, and 930 to wirelessly access and control the wireless trail camera 960 over the communications network 940. In other embodiments, the trail camera application 952 comprises a web application which can be accessed on a website of the service provider 950 to enable web-based access and control of the trail camera 960.

The communications network 940 may comprise any known communications network such as, a global computer network (e.g., the Internet), a wide area network (WAN), a local area network (LAN), an intranet, a satellite network, a telephone or cable network, a cellular network (e.g., 3G, 4G (LTE), 5G), a wireless network such as Wi-Fi or WiMAX, or various portions or combinations of these and other types of communications networks. In this regard, the term "network" as used herein is therefore intended to be broadly construed so as to encompass a wide variety of different network arrangements, including combinations of multiple networks possibly of different types, which enable wireless communications with the wireless trail camera 960.

The wireless trail camera 960 comprises a housing 970 (e.g., protective case), a visible light camera comprising a lens element 220, infrared LEDs 230 for flash illumination, light sensors 222, and a PIR motion detector 240 comprising, e.g., a Fresnel lens cover 242, similar to the exemplary trail camera embodiments discussed above. The wireless trail camera 960 comprises a back cover element 980 which is connected to the housing 970 by a hinge element 982. The back cover element 980 can be opened to access a camera power supply (e.g., batteries), control buttons (e.g., an on/off button), and status LEDs which provide status information of the wireless trail camera 960 regarding, e.g., battery power level, network connectivity, user account status, etc.

The wireless trail camera 960 further comprises an antenna 990 (and internal wireless transceiver circuitry, cellular modem, etc.) to enable wireless communication with the wireless trail camera 960. The type of antenna that is implemented will depend on the type of wireless connectivity (e.g., WiFi, cellular, Bluetooth, etc.) that is supported by the wireless trail camera 960. For example, in some embodiments, the antenna 990 comprise a multiband omni-directional antenna that is coupled to the housing 970 using a suitable connector (e.g., N connector).

FIG. 10 schematically illustrates an electronic system of wireless trail camera which implements circuitry that is configured to sense and display directional orientation and level position information for the trail camera and wirelessly transmit such information to a computing device of a user, according to an embodiment of the disclosure. More specifically, FIG. 10 illustrate an electronic system 1000 which can be implemented in the wireless trail camera 960 of FIG. 9. The electronic system 1000 comprises a circuit board 1010 which comprises various IC chips and electronic components such as processors 511, visible light camera circuitry 512 (e.g., imager and read-out circuitry), infrared LED driver circuitry 513, digital level circuitry 514, digital compass circuitry 515, PIR motion sensor circuitry 516, memory 517 (volatile and non-volatile memory), and a memory card 540, which are connected using one or more internal busses 518 (e.g., system bus, frontside bus, expansion bus, and/or others suitable types of hardware busses) and associated bridges. The IC chips and components 511, 512, 513, 514, 515, 516, 517, 518, and 540 are the same or similar to those discussed above in conjunction with FIG. 5, so a detailed description of the configuration and functions of such components will not be repeated.

In addition, to support wireless connectivity and communication, the electronic system 1000 comprises cellular modem 1120, a subscriber identification module (SIM) card 1130, and a wireless transceiver 1140. In some embodiments, the cellular modem 1120 is utilized to enable cellular connectivity to the wireless trail camera 960 using a cellular communications network (e.g., Cellular 3G, 4G (LTE) and/or 5G cellular network service). The cellular modem 1120 can be a Peripheral Component Interconnect (PCI) card or PCI express (PCIe) card that plugs into a PCI or PCIe slot in the circuit board 1010. In other embodiments, a satellite modem is utilized instead of, or in addition to, the cellular modem 1120, to enable wireless communication using a satellite communications network.

The SIM card 1130 is implemented in conjunction with the cellular modem 1120 to enable wireless communication over a cellular communications network. The SIM card 1130 comprises an IC chip that is configured to store a unique identification number (e.g., ICCID), a phone number, and other information associated with the consumer. The ICCID (Integrated Circuit Card ID) is a globally unique serial number that uniquely identifies the SIM card 1130.

The wireless transceiver 1140 is implemented to enable wireless communication on a wireless local area network (e.g., a Wi-Fi network). The wireless transceiver 1140 can be implemented using standard or proprietary wireless protocols. For example, in some embodiments, the wireless transceiver 1140 implements one or more wireless networking standards in the 802.11 set of protocols (e.g., Wi-Fi 802.11). In some embodiments, the wireless transceiver 1140 implements other wireless protocols such as Bluetooth or near field communication (NFC) to enable short-range wireless communication with the wireless trail camera 960. It is to be understood that depending on the desired wireless capabilities, the wireless transceiver 1140 can be implemented in conjunction with, or in place of, the cellular modem 1120, to support wireless connectivity with the wireless trail camera 960.

In other embodiments, although not shown in FIGS. 5 and 10, the electronic systems 500 and 1000 can include other types of sensors such as temperature sensors, humidity sensors, and other types of environmental sensors, etc., which are utilized to record environmental conditions that exist at times when images and videos are recorded by the associated trail camera. In addition, in some embodiments, the electronic systems 500 and 1000 of FIGS. 5 and 10 can implement Geo-tag GPS (global positioning system) tagging capabilities to keep track of the location of the associated trail camera to, e.g., protect against theft of the trail camera.

In some embodiments, unlike the embodiment shown in FIG. 6, the wireless trail camera 960 does not include an electronic display (e.g., LCD) screen or control buttons to control functionalities of the wireless trail camera 960. Instead, a user will access and control the functions of the wireless trail camera 960 through an application user interface of the trail camera application 952 which is downloaded from the service provider 950 and which executes on the user's computing device (e.g., smart phone 920). When a user purchases the wireless trail camera 960, the user will commence a registration process with, e.g., the service provider 950 to register the wireless trail camera 960, establish a registered user account, download the trail camera application 952 which enables remote access to trail camera controls and image/video management, and select a given data plan to activate and utilize the cellular communication functions of the wireless trail camera (assuming that the wireless trail camera supports cellular connectivity).

During the registration process, the user will upload a camera identification code to the service provider 950, which uniquely identifies the wireless trail camera 960. For example, in some embodiments, the camera identification code will be a bar code which is accessible by opening the back cover 980 of the wireless trail camera 960. The bar code is any type of static one-dimensional or multi-dimensional bar code such as a UPC (Universal Product Code) barcode or a QR code (Quick Response Code), which uniquely identifies the wireless trail camera 960. In some embodiments, the camera identification code comprises a globally unique mobile equipment identifier (MEID) or International Mobile Equipment Identity (IMEI), which uniquely identifies the wireless trail camera 960.

Furthermore, during the registration process, in embodiments where the wireless trail camera 960 supports cellular wireless communication, the user can select a given wireless data plan to enable wireless access and control of the trail camera 960 using cellular wireless communications. The type of wireless data plans will vary depending on the manufacture service provider of the trail camera. For example, the wireless data plans can be implemented based on, e.g., payment of a monthly fee, which can include unlimited data or a maximum allocated amount of data (e.g., downloaded images and/or video), etc. Some service providers can provide free wireless data plans for up to a certain number (e.g., 100) of downloaded images. The wireless data plan for a given wireless trail camera can be linked to the camera IMEI and/or the SIM card ICCID.

When the user account is established, images and videos can be transmitted from the wireless trail camera 960 directly to a computing device (e.g., tablet 910, smart phone 920, and/or laptop computer 930) of the user. The trail camera application 952 can be used for access to camera controls and image management. For example, a user can utilize the trail camera application 952 to perform functions such as (i) managing account settings and user preferences; (ii) monitoring data usage and data plans; (iii) adjusting and controlling various settings of the wireless trail camera, (iv) configuring settings for automatic transmission of captured images and/or videos (e.g., instant or delayed transmission); and (v) viewing and organizing captured images and videos.

In accordance with embodiments of the disclosure, the trail camera application 952 is configured to provide one or more user interfaces which allow a user to activate the digital level circuitry 514 and/or the digital compass circuitry 515 when mounting the wireless trail camera 960 to a fixed object (e.g., tree), and have camera levelness information and directional orientation information wirelessly transmitted in real-time from the wireless trail camera 960 to the user's computing device (e.g., smart phone) as the user is setting the wireless trail camera into proper position (e.g., strapping the wireless trail camera to a tree). For example, in some embodiments, the trail camera application 952 is configured to render and display the directional orientation information and camera levelness information on a display screen of the user's computing device (e.g., smart phone) in the same or similar manner as shown in FIGS. 7, 8A and 8B. In this configuration, the user can view the directional orientation and levelness information that is displayed on the screen of the user's computing device as the user is maneuvering the wireless trail camera 960 into the desired position.

In some embodiments, the levelness and directional orientation information can be wirelessly transmitted from the wireless trail camera 960 to the user's computing device using Bluetooth or NFC. In this instance, it is assumed that the computing device (e.g., smart phone) that is being utilized by the user to set the wireless trail camera 960 in position is in close proximity to the wireless trail camera 960 such that the trail camera 960 and user computing device can be wirelessly linked using Bluetooth or NFC to enable wireless transmission of the levelness and directional orientation information from the wireless trail camera 960 to the user's computing device without the need to utilize the cellular or Wi-Fi communications network. In instances where the trail camera 960 and/or user computing device do not implement Bluetooth or NFC, the camera levelness and directional orientation information can be wirelessly transmitted from the wireless trail camera 960 to the user's computing device over the cellular or WiFi communications network.

Following the initial mounting of the trail camera, when the user is located remote from the wireless trail camera 960, the user can utilize the trail camera application 952 to obtain current, real-time information regarding the camera levelness and camera directional orientation information to ensure that the wireless trail camera remains in the desired position. For instance, overtime, the wireless trail camera may slightly or significantly move out of position due to, e.g., the loosening of the camera mounting strap, the camera being hit by flying debris in wind, etc. In this manner, the user can remotely track the positioning of the wireless trail camera to ensure that the trail camera remains relatively level, etc.

Although exemplary embodiments of the present disclosure have been described herein with reference to the accompanying figures, it is to be understood that the disclosure is not limited to those precise embodiments, and that various other changes and modifications may be made therein by one skilled in the art without departing from the scope of the appended claims.

I claim:

1. A device for leveling and orienting a trail camera, comprising:
    a housing element comprising an upper planar surface, a bottom planar surface, and a planar sidewall surface, wherein the planar sidewall surface is perpendicular to the upper planar surface, wherein the upper planar surface comprises a first cavity and a second cavity;
    a magnetic compass mounted in the first cavity of the housing element, wherein the compass is configured for use in directionally orienting the trail camera in a target direction; and
    a bubble level mounted in the second cavity of the housing element;
    wherein the bottom planar surface and the planar sidewall surface of the housing element are configured to be placed against a flat surface of a protective case of the trail camera to determine a level position of the trail camera using the bubble level.

2. The device of claim 1, wherein the housing element comprises a planar back side surface which is perpendicular to the upper planar surface of the housing element, and wherein the device comprises an adapter element which extends from the planar back side surface, and which is configured to engage a mounting bracket of the trail camera to directionally orientate the mounting bracket using the compass, and to vertically level the mounting bracket using the bubble level.

3. The device of claim 2, wherein the adapter element comprises a stub element protruding from the planar back side surface of the housing element, and a flange element disposed at an end of the stub element, wherein the flange element is wider than the stub element.

4. The device of claim 3, wherein the stub element of the adapter element is configured to slidably engage an elongated slot of the mounting bracket of the trail camera.

5. The device of claim 4, wherein the stub element of the adapter element comprises opposing planar sidewalls which define a width of the stub element, wherein the width of the stub element is substantially the same as a width of the elongated slot to prevent the stub element from rotating within the elongated slot to thereby maintain the device in a fixed orientation when engaged with the mounting bracket.

6. The device of claim 1, wherein the housing element comprises a contoured sidewall surface, which is perpendicular to the planar upper surface, and which provides an ergonomic configuration for holding the device.

7. The device of claim 1, wherein the planar bottom surface of the housing element comprises a groove or notch which is configured to receive a rib or flange element that protrudes from an upper surface of the protective case of the trail camera to enable the bottom planar surface of the housing element to lay flat on the upper surface of the protective case.

8. The device of claim 1, wherein the housing element of the device comprises a plastic injected molded element.

9. A method for mounting a trail camera to a fixed object, comprising:
    utilizing a device to level and orient the trail camera, the device comprising (i) a housing element comprising an upper planar surface, a bottom planar surface, and a planar sidewall surface, wherein the planar sidewall surface is perpendicular to the upper planar surface, wherein the upper planar surface comprises a first cavity and a second cavity, (ii) a magnetic compass mounted in the first cavity of the housing element, wherein the compass is configured for use in directionally orienting the trail camera in a target direction, and (iii) a bubble level mounted in the second cavity of the housing element, wherein utilizing the device to level and orient the trail camera comprises:
        utilizing the compass of the device to position the trail camera to face toward a target direction;
        placing the bottom planar surface or the planar sidewall surface of the housing element of the device against a flat surface of a protective case of the trail camera; and
        maneuvering the protective case of the trail camera into a level position as indicated by the bubble level, while the bottom planar surface or the planar sidewall surface of the housing element of the device is placed against the flat surface of the protective case of the trail camera.

10. The method of claim 9, further comprising tightening a mounting strap to mount the trail camera to the fixed object, after positioning the trail camera to face toward the target direction and after maneuvering the trail camera into the level position.

11. The method of claim 9, wherein placing the bottom planar surface or the planar sidewall surface of the housing element of the device against a flat surface of a housing the protective case of the trail camera comprises placing the bottom planar surface of the housing element of the device on an upper surface of the housing protective case of the trail camera.

12. The method of claim 9, wherein placing the bottom planar surface or the planar sidewall surface of the housing element of the device against a flat surface of the protective case of the trail camera comprises placing the planar sidewall surface of the housing element of the device on a planar sidewall surface of the protective case of the trail camera.

13. The method of claim 9, wherein maneuvering the protective case of the trail camera into a level position as indicated by the bubble level, while the bottom planar surface or the planar sidewall surface of the housing element of the device is placed against the flat surface of the protective case of the trail camera comprises maneuvering the protective case of the trail camera into both a side-to-side level position and a front-to-back level position.

14. The method of claim 9, wherein utilizing the device to level and orient the trail camera further comprises:
   slidably engaging an adapter element of the device to an elongated slot of mounting bracket of the trail camera, wherein the adapter element extends from a planar back side surface of the housing element of the device, wherein the planar back side surface is perpendicular to the upper planar surface of the housing element, wherein the adapter element comprises a stub element protruding from the planar back side surface of the housing element, and a flange element disposed at an end of the stub element, wherein the flange element is wider than the stub element, and wherein the stub element is configured to slide within the elongated slot of the mounting bracket;
   placing the mounting bracket against the fixed object to which the trail camera is to be mounted while utilizing the compass of the device to position the mounting bracket to face toward the target direction; and
   maneuvering the mounting bracket into a level position as indicated by the bubble level, while the device is engaged with the mounting bracket.

15. The method of claim 14, wherein maneuvering the mounting bracket into a level position as indicated by the bubble level comprises maneuvering the mounting bracket into a side-to-side level position, while the device is attached to the mounting bracket.

16. A trail camera comprising:
   a protective case;
   a camera fixedly disposed within the protective case;
   at least one bubble level integrally disposed on or within a surface of the protective case, wherein the bubble level is configured to enable vertical leveling of the trail camera; and
   a magnetic compass integrally disposed on or within a surface of the protective case.

17. The trail camera of claim 16, wherein the magnetic compass is disposed on or within an upper surface of the protective case.

18. The trail camera of claim 16, wherein the at least one bubble level is integrally disposed on or within a sidewall surface of the protective case.

19. The trail camera of claim 16, wherein the at least one bubble level is integrally disposed on or within a front side surface of the protective case.

20. The trail camera of claim 16, wherein the at least one bubble level comprises (i) a first bubble level that is integrally disposed on or within a sidewall surface of the protective case and (ii) a second bubble level that is integrally disposed on or within a front side surface of the protective case.

* * * * *